United States Patent [19]
Cook

[11] 3,774,595

[45] Nov. 27, 1973

[54] FORCED EXPIROMETER

[76] Inventor: Galen B. Cook, 1028 Marchelta Ln., Pebble Beach, Calif.

[22] Filed: July 13, 1971

[21] Appl. No.: 162,123

[52] U.S. Cl. .............................. 128/2.08, 128/2 C
[51] Int. Cl. .............................................. A61b 5/08
[58] Field of Search ..................... 128/2 C, 2 F, 2 R, 128/2 S, 2.07, 2.08; 73/379; 272/57 R

[56] References Cited
UNITED STATES PATENTS

| | | | |
|---|---|---|---|
| 3,036,569 | 5/1962 | Clements et al. ................... | 128/2.08 |
| 3,367,324 | 2/1968 | DeBono ............................ | 128/2.08 |
| 3,311,109 | 3/1967 | Gruen et al. ....................... | 128/2.08 |
| 3,608,546 | 9/1971 | Shinn ................................ | 128/2.08 |

Primary Examiner—William E. Kamm
Attorney—Philip B. Polster et al.

[57] ABSTRACT

A forced expirometer has a U-shaped timing track with a rolling ball in it for timing an exhalation. Simple means are provided to compare the quantity of air exhaled during subsequent periods in the timing sequence. The ball, preferably in the form of a heavy steel ball bearing, rolls along the timing track and directs passage of exhaled air sequentially along branches of the U-shaped tube. The tube branches have a metering orifice and exhaust ports which divide the air volume in a pre-selected ratio. The air flowing through the metering orifice drives a light weight piston. A method of detecting constriction of human airways embodies, in a simple apparatus, means for converting an air volume to a linear measurement.

9 Claims, 3 Drawing Figures

Patented Nov. 27, 1973
3,774,595
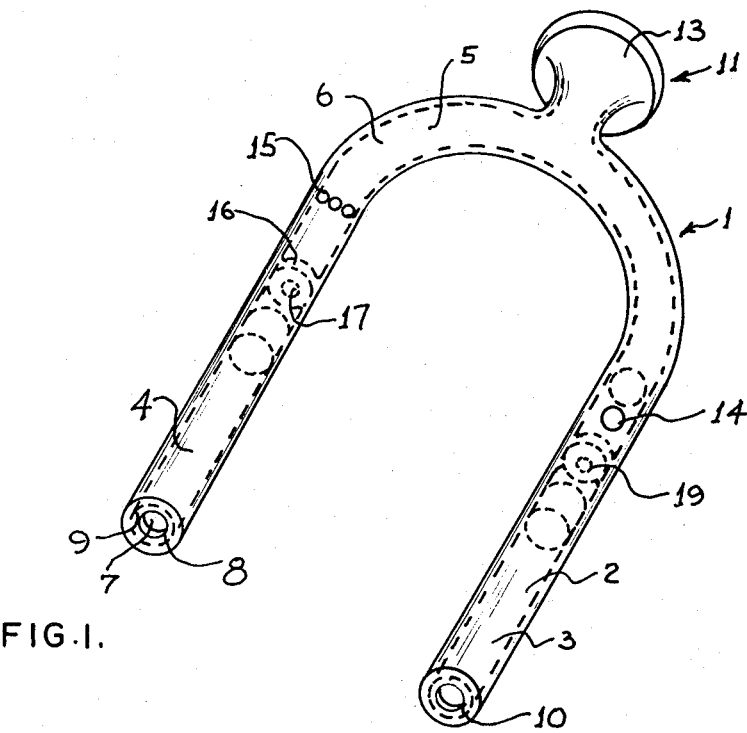
FIG.1.
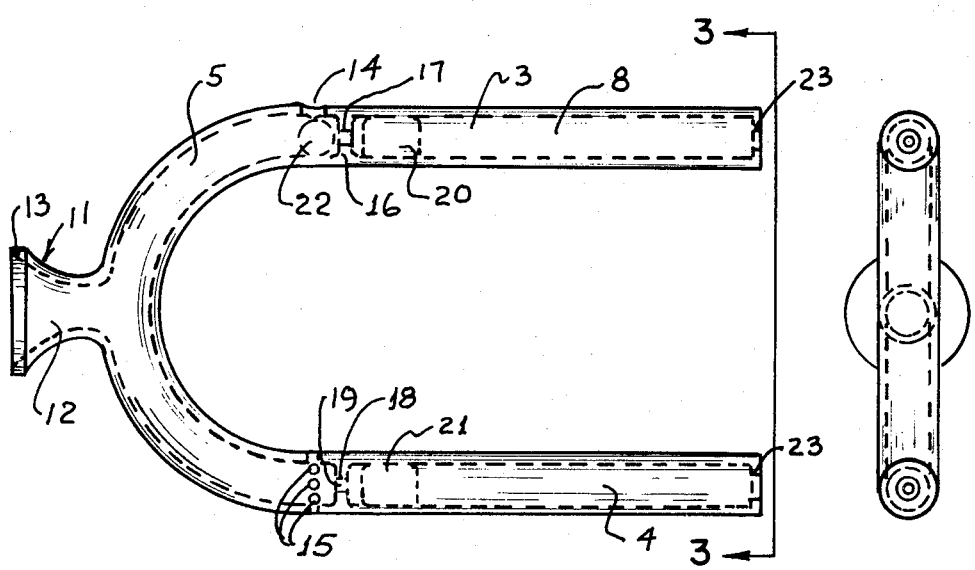
FIG.2.
FIG.3.
INVENTOR:
GALEN B. COOK.
BY: Lionel S. Lundari

FORCED EXPIROMETER

BACKGROUND OF THE INVENTION

This invention relates to a device for measuring differences in the volume of air which can be forceably exhaled by a man during successive periods in a complete exhalation.

In the normal, healthy individual, 83 percent of the total air volume which can be expelled during any one forced exhalation occurs in the first one second after exhalation commences. The remaining 17 percent of the total air volume is expelled in the remaining time of that exhalation. Certain diseases, such as pulmonary emphysema and chronic airways obstruction due to bronchitis or cancer, reduce the ability to exhale large volumes of air in the initial one-second interval. Rather, the volume of air exhaled is extended over the total time available for exhalation.

Presently, measurements of relative air volumes are made on complex equipment as found in pulmonary physiology laboratories. Such machines are expensive to manufacture and require extensive training for their operation and for the interpretation of data presented. My invention provides an apparatus that compares these two air volumes easily, inexpensively, accurately and safely. The test affords information which is useful in detecting lung disease and assessing its severity. The apparatus described hereinafter may be disposable, and permits the determination of forced expiration volumes by any physician, a paramedical assistant, or the patient himself without costly equipment or specialized knowledge.

One of the objects of this invention is to provide a simple test for determining airway obstruction.

Another object of this invention is to provide a low cost testing apparatus that may be made disposable after use.

Still another object of this invention is to provide a testing apparatus wherein relative volumes of air in a forced expiration may be compared easily.

Other objects will become apparent to those skilled in the art in light of the following description and accompanying drawings.

SUMMARY OF THE INVENTION

In accordance with this invention, generally stated, an apparatus is provided which permits ready comparisons between relative volumes of air during successive times in one forced exhalation.

In the preferred embodiment, a mouthpiece is provided in the extrados of an arch-shaped tube. Air exhaled into the apparatus is sequentially directed into one and the other leg of the tube. A simple timing device functions both to block air flow in the alternate legs and to time the exhalation in each leg. The legs contain movable cylinders whose distance of travel may be compared to give a quick test for and rough measurement of airways obstruction.

BRIEF DESCRIPTION OF THE DRAWINGS

FIG. 1 is a view in perspective of the forced expirometer of my invention;

FIG. 2 is a plan view of the apparatus illustrated in FIG. 1; and

FIG. 3 is a view taken along the line 3—3 of FIG. 2.

DESCRIPTION OF THE PREFERRED EMBODIMENT

Referring now to FIG. 1, reference numeral 1 indicates one illustrative embodiment of forced expirometer of my invention. Expirometer 1 generally has an arch or U-shaped enclosure 2 with a straight upper leg 3 and a straight lower leg 4 joined by an integrally constructed timing track 5.

Enclosure 2 is tubular in construction, having an outer wall 6, an inner wall 7, and a longitudinal opening 8 running the entire length of the enclosure, through leg 3, leg 4 and track 5. Legs 3 and 4 are open to the atmosphere at an end 9 and an end 10, respectively. A boss 23 may be provided to close a portion of the ends 9 and 10.

A mouthpiece 11, in the preferred embodiment, is formed integrally with enclosure 2. Mouthpiece 11 is conventional and includes a lip-engaging section 13. Mouthpiece 11 has an axial opening 12 through it, which joins opening 8 of tubular enclosure 2 along the extrados of timing track 5. Other embodiments of my invention may be adapted to provide handling or mounting means between mouthpiece 11 and timing track 5. For example, a handle may be formed along the junction of mouthpiece 11 and track 5. Such an embodiment would enable the user to position the expirometer properly.

Leg 3 has an opening 14 from and through walls 6 and 7 in that area of the enclosure 2 where leg 3 blends into timing section 5. Opening 14, in fact, is placed at the borderline between leg 3 and timing section 5. Likewise, leg 4 has a plurality of small openings 15 and through walls 6 and 7 in the area of enclosure 2 where leg 4 blends into timing section 5. While a plurality of openings 15 are illustrated in the preferred embodiment, a single opening in leg 4 works well. I prefer the use of the plural openings in order to further distinguish the respective legs of my apparatus, the purpose of which will become apparent hereinafter. The size of openings 15 and 14 is important and their relationship will be discussed further in the functional description later set forth.

An annular shoulder 16 defining a metering orifice 17 is positioned within opening 8 of leg 3, near the opening 14 in enclosure 2.

Leg 4 has an annular shoulder 18 defining a metering orifice 19 near the openings 15 through enclosure 2.

Legs 3 and 4 contain movable pistons 20 and 21, respectively. Pistons 20 and 21 are identical, with the exception of color, and are free to move in the opening 8 of each leg. Pistons 20 and 21 are constructed from lightweight material, and may be hollow solid, depending on the density of the material used in their construction. The diameters of each cylinder-shaped piston are chosen so that the pistons move freely within each leg, in response to exhalations made through mouthpiece 11, as will be explained in detail hereinafter. I prefer to use different colors for pistons 20 and 21 as an aid in distinguishing the upper and lower legs of my apparatus.

A steel ball bearing 22 is carried in timing track 5. Bearing 22 is conventional and can be a common ball bearing. The diameter of ball bearing 22 is chosen to enable it to roll freely along track 5 while simultaneously obstructing the passage of air from a forced exhalation past ball bearing 22 into either leg 3 or leg 4 depending upon the location of the ball bearing.

As indicated above, the size of opening 14 is important. First, it must be large enough to permit the user of the apparatus to hold ball bearing 22 in the position indicated in FIG. 2 prior to one forced exhalation. Second, in the preferred embodiment shown, the area of opening 14 is to combined areas of openings 15 as 17 is to 83. That is to say, the area of openings 15 is approximately five times the area of opening 14. In addition, orifices 17 and 19 respectively are sized so that their area compares to the area of the openings near which they are placed as 5 is to 95. Restated, the orifices are designed to permit only a small portion of air in one forced exhalation to enter the respective legs as most of that air is vented to the atmosphere through either openings 14 or 15.

The positioning of mouthpiece 11 along the extrados of timing track 5 is important. Bearing 22 should pass opening 12 in mouthpiece 11 after one second of a forced exhalation. While the apparatus in FIG. 2 is illustrated with a mouthpiece placed midway between the legs 3 and 4, the placement of the mouthpiece 11 may vary in commercial embodiments of my invention in order to maintain the one second in travel time of bearing 22.

Forced expirometer 1 is prepared for use by turning it so that gravity allows bearing 22 to rest under opening 14 wherein it is retained by the fingertip. Expirometer 1 is then rotated to allow pistons 20 and 21 to slide and come to rest against the shoulders defining orifices 17 and 19 respectively. Expirometer 1 is held horizontally, in the position illustrated in FIG. 2, and a full breath is inhaled. Determining the proper attitude of the apparatus is facilitated by the color coded pistons and opening size discussed above. The user places the mouthpiece 11 securely within his lips and simultaneously releases bearing 22 and initiates one forced exhalation. As bearing 22 rolls down track 5, it blocks air attempting to reach leg 3 and forces that air towards leg 4. Approximately 95 percent of the air vents to the atmosphere through openings 15. The remaining 5 percent passes through orifice 19 into leg 4, and moves piston 21 forward.

After one second of the forced exhalation, bearing 22 passes by opening 12 in mouthpiece 11. It thereafter blocks air attempting to enter leg 4, and forces that air towards leg 3. Again, approximately 95 percent of the air is vented through opening 14 to the atmosphere, the remaining 5 percent entering leg 3 through orifice 17. Air entering leg 3 drives piston 20 forward.

The forward movements of both pistons are then compared. If piston 20 has moved a greater distance than piston 21, then the one second forced expiratory air volume is less than 83 percent of the total volume of air exhaled, indicating that lung disease should be suspected and appropriate measures taken.

Simple construction is provided. The embodiment illustrated is intended to be disposable after use, and is constructed of plastic. Congruent halves are manufactured, and bearing 22, shoulders or rings defining orifices 17 and 19, and pistons 20 and 21 are loaded in half of the enclosure 2. The second half of enclosure 2 is then placed in position and heat sealed. The shoulders or rings defining the orifices can be molded integrally with the tube.

Merely by way of illustration and not by way of limitation, the following dimensions have been found to perform well:

Enclosure 2 — ⅜ inch diameter polycarbonate tubing bent on a 1-½ inch radius
Legs 3 and 4 — 4 inches in length
Opening 14 — 3/16 inch diameter
Opening 15 — 5 openings each 3/16 inch diameter
Orifice 17, 19 — 1/64 inch diameter As an alternative to the construction described above, a piece of plastic tubing can be used, bent into the proper shape, drilled or otherwise punctured for the holes 14 and 15 and a hole to receive a mouthpiece, rings defining the orifices 17 and 18 can be force fit into place from the open ends of the legs, the pistons 20 and 21 can be inserted and some form of stop can be put in the ends of the legs.

Numerous variations within the scope of the appended claims will appear to those skilled in the art in light of the foregoing description and accompanying drawings. Thus, the design of the pistons 20 and 21 may be varied. While the pistons 20 and 21 were described as cylindrical, other shapes, for example, spherical, work well. Enclosure 2 may be altered. For example, timing track 5 may extend vertically upwardly with legs 3 and 4 extending outwardly therefrom, roughly corresponding to a written Greek letter pi. Steel bearing 22 may be replaced with a glass marble, or a cube may be utilized with a rectangular square timing track, for example. The preferred embodiment has been described as plastic. Other materials, however, may be used while the disposable feature is retained. Thus, the device may be constructed from metal with transparent leg portions or transparent areas in the legs. The mouthpiece 13 may be removably mounted in the extrados and constructed from a low cost material, plastic for example. In such an embodiment, the mouthpiece alone is disposable and is changed for each patient. Since the patient does not inhale during use, the metal portions of the device need not be sterilized after each use, but would be cleansed periodically. These variations are merely illustrative.

Having thus described the invention, what is claimed and desired to be secured by Letters Patent is:

1. A testing apparatus comprising: an enclosure including a U-shaped tube, said tube having a first leg, a second leg, and a curved connecting part between said first and said second legs, each of said first and said second legs of said U-shaped tube having at least one opening in them venting said tubular enclosure to the surrounding atmosphere, the area of the opening in one of said first and said second legs approximately being in the ratio of 83 to 17 when compared to the area of the opening in the other of said first and second legs;

means for injecting air from one forced exhalation into said apparatus enclosure, said injecting means including a mouth piece mounted to said enclosure along said curved connecting part of said U-shaped tube;

means for dividing the air exhaled during said forced exhalation into a first air volume and a second air volume, said last mentioned means including a bearing rollable along said curved connecting part of said U-shaped tube from a first position on a first side of said mouth piece to a second position on a second side of said mouth piece whereby air from said forced exhalation alternately enters the legs of said U-shaped enclosure, depending upon the position of said bearing with respect to said mouth piece, the movement of said bearing from one of said first position and said second position to said mouth piece occurring in approximately a one second time interval.

2. The apparatus of claim 1 wherein the area of the opening in at least one of said legs is formed by a plurality of openings in said leg.

3. A disposable testing apparatus for detecting airways obstructions which comprises:

an enclosure including a U-shaped tube having a curved part with a predetermined radius of curvature, a first leg extending horizontally from said curved part, and a second leg extending horizontally from said curved part, said tube having a plurality of openings in it at the juncture of said curved part with each of said legs, said openings being adapted for venting a portion of said air from said enclosure and distributing a portion of said air to said legs, the area of the opening in said first leg approximately being in the ratio of 17 to 83 when compared to the area of the opening of said second leg;

a mouth piece joined to said tube along said curved portion of said tube;

a pair of annular shoulder means having at least one opening in each of them, one of said annular shoulder means being positioned in each of said first and said second leg portions adjacent said tube openings;

a first and a second piston, one each of said pistons being carried in said first and said second leg portions, said pistons being freely movable therein; and a ball, carried in said curved part and movable therein whereby air from a forced exhalation is directed to alternate ones of said legs, said ball blocking air passage to said first leg while said ball is on a first side of said mouth piece and permitting air passage to said first leg and blocking air passage into said said second leg as said ball moves past said mouth piece to a second side of said mouth piece, the blocking time provided by said ball to said first leg being approximately one second.

4. The testing apparatus of claim 3 wherein the open areas formed by said plurality of openings in the juncture of said curved part in said legs is in the ratio of approximately 5 to 1.

5. A testing apparatus comprising:

an enclosure, said enclosure including a timing portion having a first end and a second end, a first distance measuring portion attached to said first end of said timing portion, a second distance measuring portion attached to said second end of said timing portion, said second distance measuring portion being spaced from and approximately parallel to said first distance measuring portion, said enclosure having an open area in it near each of the connections of said first and said second distance measuring portions and said timing portion for venting said enclosure to the surrounding atmosphere, the area of the open area along said first distance measuring portion being approximately five times greater than the open area along said second distance measuring portion;

means for injecting air from one forced exhalation into said apparatus enclosure, said injecting means being attached to said enclosure along said timing portion;

means for timing and directing the air exhaled during said forced exhalation, said last mentioned means comprising a member movable along said timing portion from a first position on a first side of said injecting means to a second position on a second side of said injecting means, movement of said last mentioned means between said first position and said injecting means occurring in approximately a one second time interval, said timing and directing means alternately directing exhaled air into said first distance measuring portion for said one second time interval, and into said second distance measuring portion for a second time period; and indicator means movably responsive to air volume entering each of said first and said second distance measuring portions, carried in respective ones of said first and said second distance measuring portions.

6. The apparatus of claim 5 wherein the open area in at least one of said first and said second distance measuring portions comprises a plurality of openings in said enclosure.

7. The apparatus of claim 6 wherein the open area of one of said first and said second distance measuring portions compares with the open area of one of the other of said first and said second distance measuring portions in the ratio of 83 to 17.

8. The apparatus of claim 5 wherein said enclosure comprises a U-shaped tube having a curved portion, said curved portion forming the timing portion of said enclosure, and said means for injecting air into said apparatus enclosure comprises a mouth piece joined to said tube along the curved portion of said U-shaped tube.

9. The apparatus of claim 8 wherein said timing and directing means comprises a steel bearing which rolls along said timing portion from a first position on a first side of said mouth piece to a second position on a second side of said mouth piece.

* * * * *